United States Patent
Izumo et al.

(10) Patent No.: US 9,285,263 B2
(45) Date of Patent: Mar. 15, 2016

(54) MEASUREMENT DEVICE (71) Applicants: Naoto Izumo, Kitamoto (JP); Akiyoshi Ota, Kitamoto (JP)

(72) Inventors: Naoto Izumo, Kitamoto (JP); Akiyoshi Ota, Kitamoto (JP)

(73) Assignee: A&D Company, Limited, Tokyo (JP)

(*) Notice: Subject to any disclaimer, the term of this patent is extended or adjusted under 35 U.S.C. 154(b) by 176 days.

(21) Appl. No.: 14/353,640

(22) PCT Filed: Oct. 17, 2012

(86) PCT No.: PCT/JP2012/076773
§ 371 (c)(1),
(2) Date: Apr. 23, 2014

(87) PCT Pub. No.: WO2013/065481
PCT Pub. Date: May 10, 2013

(65) Prior Publication Data
US 2014/0291043 A1    Oct. 2, 2014

(30) Foreign Application Priority Data

Nov. 4, 2011  (JP) .................................. 2011-241810

(51) Int. Cl.
*G01G 23/00* (2006.01)
*G01G 21/22* (2006.01)
(Continued)

(52) U.S. Cl.
CPC ................ *G01G 21/23* (2013.01); *G01G 21/22* (2013.01); *G01G 23/00* (2013.01); *G01G 23/005* (2013.01); *G01G 23/06* (2013.01)

(58) Field of Classification Search
CPC ..... G01G 23/00; G01G 23/005; G01G 23/02; G01G 23/04; G01G 23/06; G01G 21/22; G01G 21/23
See application file for complete search history.

(56) References Cited

U.S. PATENT DOCUMENTS 3,301,341 A * 1/1967 Fathauer ............. G01G 19/028
                                                                  177/184
4,411,325 A * 10/1983 Hamilton ............. G01G 3/1402
                                                                  177/136
(Continued)

FOREIGN PATENT DOCUMENTS

JP   Hei-5-14850   2/1993
JP   08-005443     1/1996
(Continued)

OTHER PUBLICATIONS

International Search Report PCT/JP2012/076773 mailed Nov. 20, 2012.

*Primary Examiner* — Randy W Gibson
(74) *Attorney, Agent, or Firm* — Roberts Mlotkowski Safran & Cole, PC (57) ABSTRACT

To prevent measurement errors caused by impact including an impact load transmitted at high speed or static electricity and prevent destruction of a sensor unit due to the above-mentioned impact load. Through-holes (12f) are formed in four corners of a pan receiver, upwardly protruding pieces (14a) of a plate spring fixed to a bottom surface of the pan receiver are inserted into the through-holes (12f), and pan receiver legs are attached to the upwardly protruding pieces (14a). When a pan is mounted on the pan receiver, four corners of the pan are supported by the upper surfaces of gel-like cushioning bodies and the upper ends of coil springs, impact applied to the pan including an impact load transmitted at high speed is absorbed by the gel-like cushioning bodies, and the lower ends of the coil springs contact the upwardly protruding pieces (14a) of the plate spring, so that the pan assumes a conducting state with the pan receiver via the coil springs and the plate spring, and even if the pan is charged with static electricity, the static electricity due to charging can be released to the pan receiver via the coil springs and the plate spring.

4 Claims, 5 Drawing Sheets

(51) Int. Cl.
*G01G 21/23* (2006.01)
*G01G 23/06* (2006.01)

(56) References Cited

U.S. PATENT DOCUMENTS

| | | | | |
|---|---|---|---|---|
| 4,411,327 A * | 10/1983 | Lockery | ............... | G01G 3/1402 177/211 |
| 4,489,797 A * | 12/1984 | Gordon | ................. | G01G 21/24 177/128 |
| 4,619,337 A * | 10/1986 | Behrend | ................ | G01G 21/28 177/189 |
| 4,726,435 A * | 2/1988 | Kitagawa | ............... | G01G 23/06 177/154 |
| 5,232,061 A * | 8/1993 | Neeleman | ............. | G01G 23/06 177/184 |
| 5,521,334 A * | 5/1996 | Freeman | ............. | G01G 23/005 177/154 |
| 5,600,104 A * | 2/1997 | McCauley | ............ | G01G 19/12 177/136 |
| 5,747,746 A * | 5/1998 | Bergan | ................. | G01G 21/23 177/134 |
| 5,991,676 A * | 11/1999 | Podoloff | ............ | G01G 19/4142 177/144 |
| 6,340,799 B1 * | 1/2002 | Hama | .................... | G01G 21/23 177/184 |
| 6,958,453 B2 * | 10/2005 | Burkhard | ............. | G01G 23/005 177/184 |
| 7,455,343 B2 * | 11/2008 | Endo | ...................... | B60N 2/002 296/65.13 |
| 7,836,997 B2 * | 11/2010 | Takayasu | ............... | B60N 2/002 177/136 |
| 2005/0103535 A1 * | 5/2005 | Honda | ................... | G01G 21/23 177/187 |
| 2006/0048582 A1 * | 3/2006 | Furukawa | ................ | G01N 3/02 73/856 |

FOREIGN PATENT DOCUMENTS

| | | |
|---|---|---|
| JP | 08-128886 | 5/1996 |
| JP | 2002-214030 | 7/2002 |
| JP | 2005-283334 | 10/2005 |
| JP | 2008-116223 | 5/2008 |
| JP | 2012-83329 | 4/2012 |

* cited by examiner

Fig. 8

MEASUREMENT DEVICE

TECHNICAL FIELD

The present invention relates to a measurement device that can be applied to any type of an electromagnetic balance type for measuring the mass of a measuring object placed on a pan based on a load that acts on a pan receiver from the pan, an electrostatic capacitance type, or a load cell type, and particularly concerns a technique effective for a high-resolution measurement device.

BACKGROUND ART

In a high-resolution measurement device, an overload, particularly, an impact load in which a great load is impulsively applied has been known as a first factor for hindering accurate weighing. Conventionally, as measures for cushioning and absorbing the impact load, shock absorber mechanisms using elastic members such as coil springs or rubber have been proposed (refer to Patent Literatures 1 and 2). These shock absorber mechanisms use a method in which a kinetic energy is absorbed as an energy the coil springs or rubber has, and are thus effective for static overloads.

However, recently, weighing work by automatic machines has increased, and an operation using a motor or pneumatic equipment as a driving source is performed in the case using an automatic machine, and thus as compared with manual weighing work, an impact load in which a load ranging from a few times to a few tens of times is impulsively applied is produced. Because this impact load is transmitted at high speed, in the conventional shock absorber mechanism using the method in which a kinetic energy is absorbed as an energy the coil springs or rubber has, in which the pan position is mechanistically lowered by using a set load of coil springs or rubber, there has been a situation such that the impact cannot be sufficiently absorbed to disable appropriate weighing, and the measurement device, particularly, its sensor unit cannot be protected, so that the sensor unit is sometimes destroyed.

Moreover, a second factor for hindering accurate weighing of a high-resolution measurement device is charging of a measuring object. When the mass of a measuring object is measured, if the measuring object is charged by static electricity or a measurer himself/herself is charged by static electricity, accurate weighing can no longer be performed as a result of charging with static electricity. That is, when static electricity builds up in a weighing pan, lines of electric force are generated between the pan and a case that supports the pan, a force by the static electricity acts in the direction of the lines of electric force, the force by static electricity interferes with a measurement value, and the measurement value changes with an elapse of the discharge time of static electricity in some cases. In particular, in an indoor environment, such as a clean room or a constant temperature room, in which an air conditioner is continuously operated, it often becomes a low humidity of 20% or less, and a charging phenomenon occurs with the low humidity, and accurate weighing can no longer be performed due to the charging phenomena in some cases.

Therefore, methods such as inserting an electrical resistance element having an ohmic value between the pan and pan receiver or inserting various metallic conductive components such as plate springs and other springs between the pan receiver and pan have been tried. However, these techniques, in which an additional component(s) is required for adding an anti-static function and the additional component(s) serves as an obstruction during cleaning, are thus not sufficient for simplification in structure for even suppressing phenomena resulting from charging with static electricity. Therefore, as an arrangement for eliminating these drawbacks, there has been a proposal that projecting pieces of a plate spring fixed to a pan receiver are penetrated through pan receiver legs supporting the pan and are brought into contact with the pan (refer to Patent Literature 3). However, indeed this proposal is effective as a measure in the case where a pan is charged with static electricity, but similar to the conventional shock absorber mechanisms, the arrangement in which protruding pieces of a plate spring are brought into contact with a pan does not serve as a solution for the foregoing first factor.

CITATION LIST

Patent Literature

Patent Literature 1: Japanese Published Unexamined Patent Application No. 1-108-128886
Patent Literature 2: Japanese Published Unexamined Patent Application No. 1-108-5443
Patent Literature 3: Japanese Published Unexamined Patent Application No. 2005-283334

SUMMARY OF INVENTION

Technical Problem

As above, conventionally, there has been no measurement device with measures taken against impact being a first factor to hinder accurate weighing, particularly, an impact load transmitted at high speed, and also, there has been no measurement device with measures taken against both of the impact being the first factor and charging being a second factor.

The present invention has been made in view of the above-mentioned conventional problems, and an object of the present invention is to provide a measurement device in which a measurement error and destruction of the sensor unit due to the first factor described above and a measurement error due to the second factor described above have both been eliminated.

Solution to Problem

In order to achieve the above-mentioned object, a measurement device according to a first aspect of the invention includes a pan formed so that a measuring object can be mounted thereon, a pan receiver disposed facing the pan, a conductive plate spring fixed to the pan receiver and formed with a plurality of upwardly protruding pieces, and a pan receiver leg attached and integrated with each upwardly protruding piece of the plate spring so that the upwardly protruding piece is exposed from an opening provided at a distal end of a top-of-head portion, and the pan receiver is coupled with a side of application of load of a weighing sensor that weighs a measuring object on the pan based on a load that acts on the pan receiver, while the measurement device further includes a gel-like cushioning body that contacts the pan at an upper surface and is placed at a lower surface side via a placing plate on the top-of-head portion of the pan receiver leg and a conductive spring member that is supported on the gel-like cushioning body and disposed between the pan and the upwardly projecting piece of the plate spring in order to make the pan and the pan receiver conductive with each other.

The conductive spring member consists of a coil spring or a plate spring, and is supported on the gel-like cushioning body to contact the upwardly protruding piece of the plate spring. More specifically, in the case of, for example, a coil spring, it is preferable to arrange the coil spring so as to be supported at the upper end on the gel-like cushioning body, be reduced in diameter toward the lower end to be inserted through the respective central holes of the gel-like cushioning body and the placing plate, and contact the upwardly protruding piece of the plate spring, while contacting the pan at the upper end. As the conductive spring member, a conductive spring member for which the front surface of an insulating material is treated to be conductive can be considered, besides ones made of a metal and made of a conductive synthetic resin.

(Action) The gel-like cushioning body absorbs by deformation an impact load transmitted at high speed produced in weighing work by an automatic machine and the like, and the conductive spring member is also deformed at this time to make adsorption of the impact load by the gel-like cushioning body more reliable, whereby the occurrence of an error in measurement value can be prevented, and a sensor unit of the measurement device can be protected. Moreover, even if the pan is charged with static electricity, the conductive spring member can reliably release the static electricity to the pan receiver via the upwardly protruding piece of the plate spring.

Moreover, in a second aspect of the invention, the measurement device according to the first aspect of the invention is arranged such that the placing plate has an annular projection edge that is annular and along a central hole, and is installed in this annular projection edge part on the top-of-head portion of the pan receiving leg, and the gel-like cushioning body is annular, and fixed at its central hole with the annular projection edge to be fixed to the placing plate.

(Action) An impact load transmitted at high speed produced in weighing work by an automatic machine and the like can be absorbed by the gel-like cushioning body, and at this time, the annular gel-like cushioning body is fitted at its central hole with the annular projection edge of the placing plate, and is fixed in a stable manner, and thus absorption of the impact load is made more reliable, and fracture or breakage due to a creep phenomenon of the gel-like cushioning body is prevented to maintain cushioning performance over a long period of time.

Moreover, in a third aspect of the invention, the measurement device according to the first or second aspect of the invention is arranged such that through-holes are formed in four corners of the pan receiver, the plate spring is fixed close to an edge portion on a back surface side of the pan receiver and formed at both end sides thereof with upwardly protruding pieces that penetrate through the respective through-holes upward, and the pan receiver leg is formed in a mushroom shape, and is attached and integrated with each upwardly protruding piece of the plate spring so that an upper end of the upwardly protruding piece is exposed from an opening provided in a top-of-head portion of an umbrella portion having a circular arc shape in a longitudinal section thereof.

(Action) When supporting the pan, because four corners of the pan are supported on upper surfaces of the gel-like cushioning bodies, rattling in the vertical direction and rattling in the horizontal direction due to an offset load and the like that act on the pan during weighing do not occur.

Advantageous Effects of Invention

As is apparent from the above description, by the measurement device according to the first aspect of the invention, impact including an impact load transmitted at high speed and an error in measurement value caused by charging by static electricity are prevented, and thus accurate weighing is always assured and destruction of a sensor unit due to an impact load transmitted at high speed is prevented.

Moreover, by the measurement device according to the second aspect of the invention, because the gel-like cushioning body is fixed to the mounting plate in a stable manner, even if a strong impact not less than a predetermined value including an impact load transmitted at high speed is applied, the occurrence of an error in measurement value is more reliably prevented, and prevention of destruction of a sensor unit due to an impact load transmitted at high speed also becomes more reliable.

Further, by the measurement device according to the third aspect of the invention, the occurrence of an error in measurement value resulting from impact including an impact load transmitted at high speed or charging with static electricity is reliably prevented, destruction of a sensor unit due to an impact load transmitted at high speed is prevented, and additionally, the pan is supported in a state free from rattling, and thus accurate weighing is assured for a long period of time.

DESCRIPTION OF EMBODIMENTS

Figure 1:
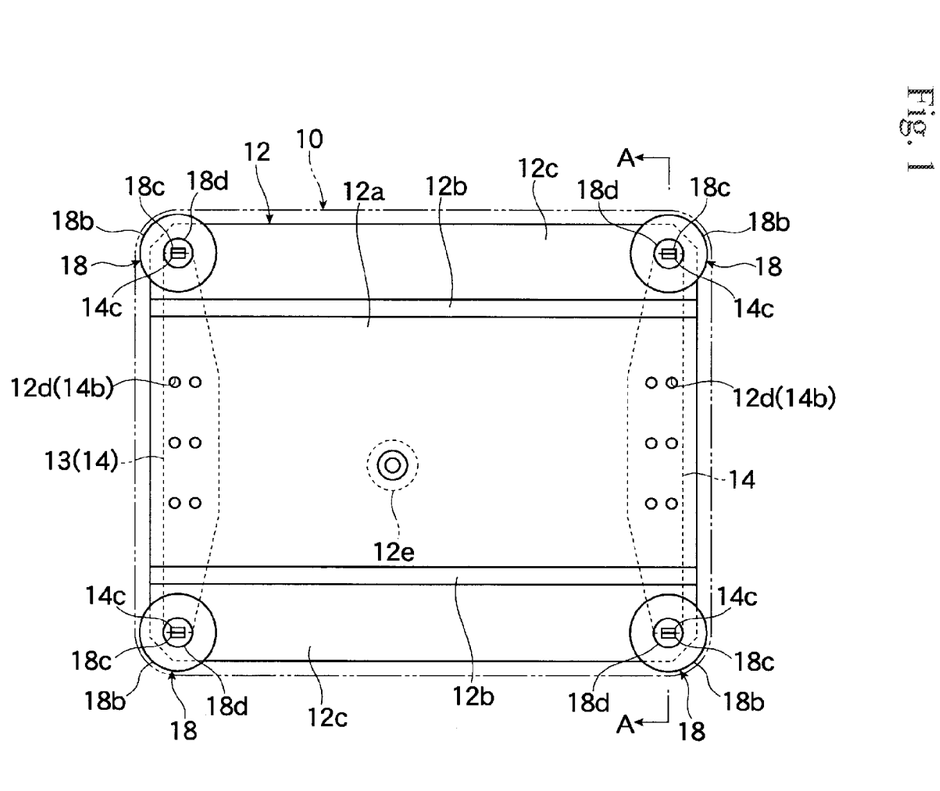
FIG. 1 is a plan view when a pan is removed from a pan receiver of a load receiving portion of a measurement device which is an example of the present invention.
Figure 2:
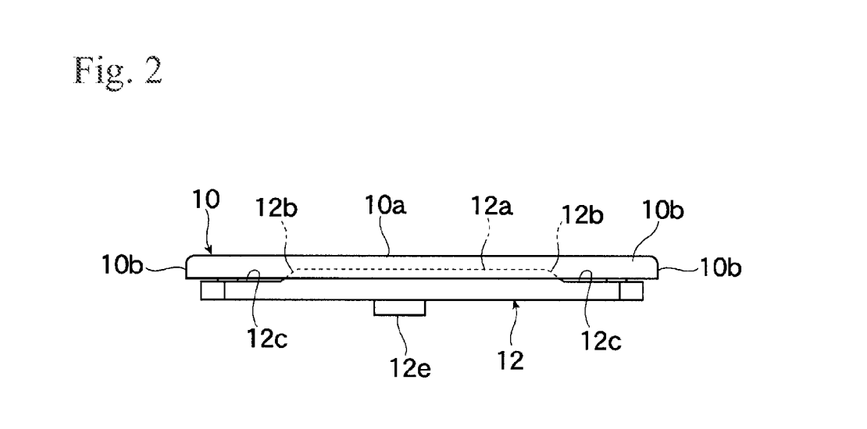
FIG. 2 is a right side view of the load receiving portion when the pan is attached to the pan receiver.
Figure 3:
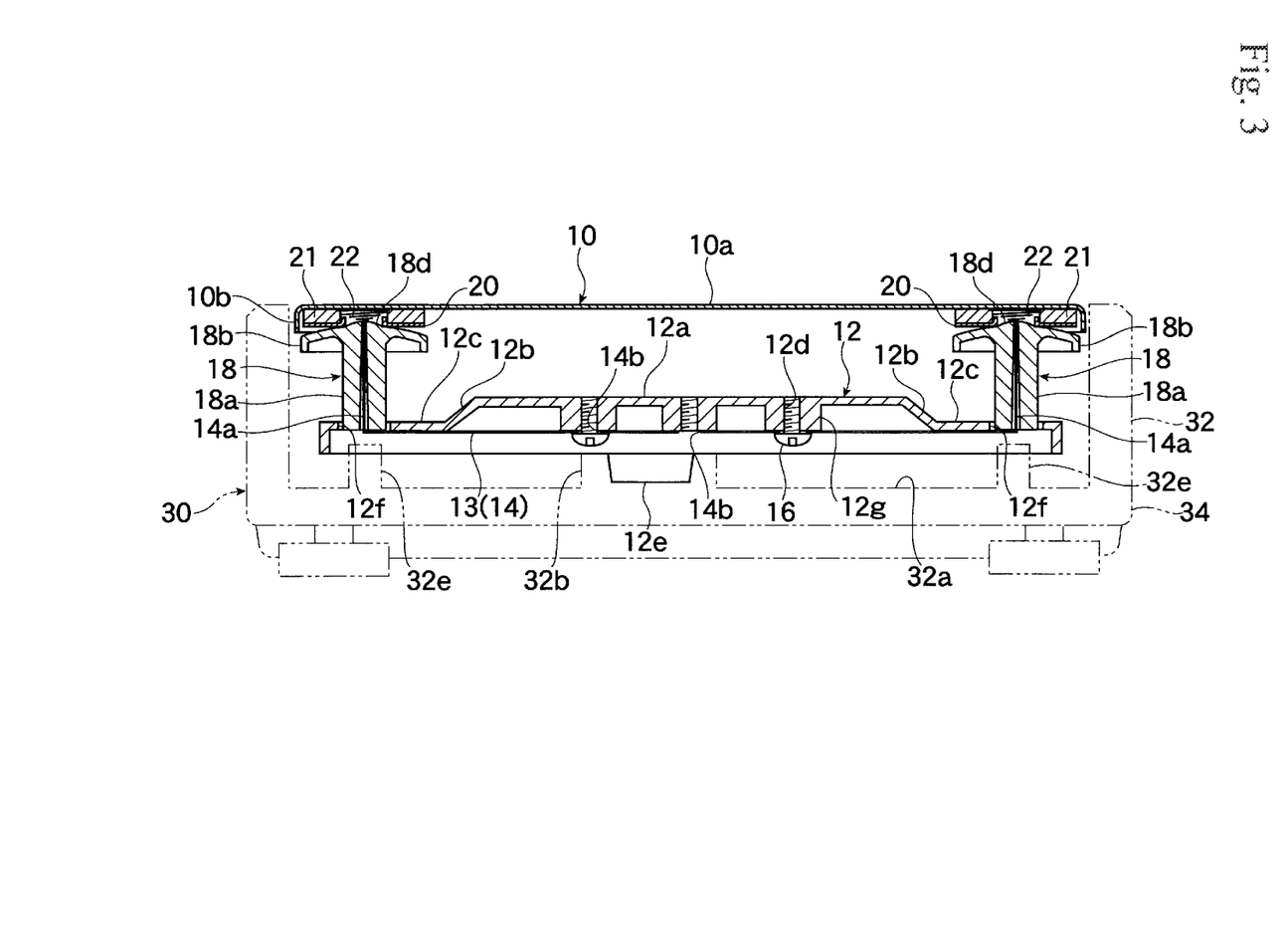
FIG. 3 is a view showing a relationship between the load receiving portion and a measurement device body when a plate spring is fixed at positions close to both end portions in the long-side direction, which is a sectional view taken along the line A-A of FIG. 1.
Figure 4:
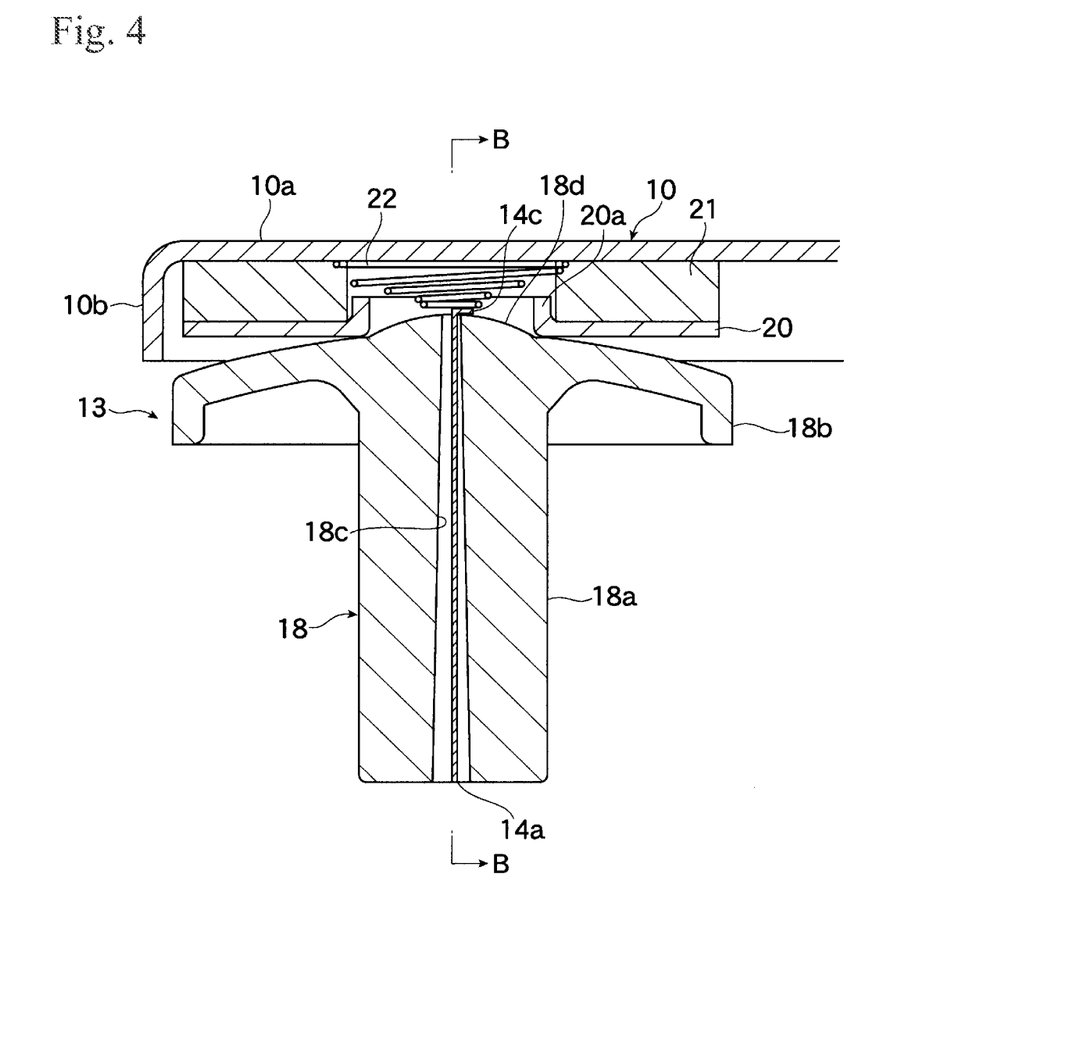
FIG. 4 is an enlarged sectional view showing a state where the pan is supported by a pan receiver leg via a gel-like cushioning body.
Figure 5:
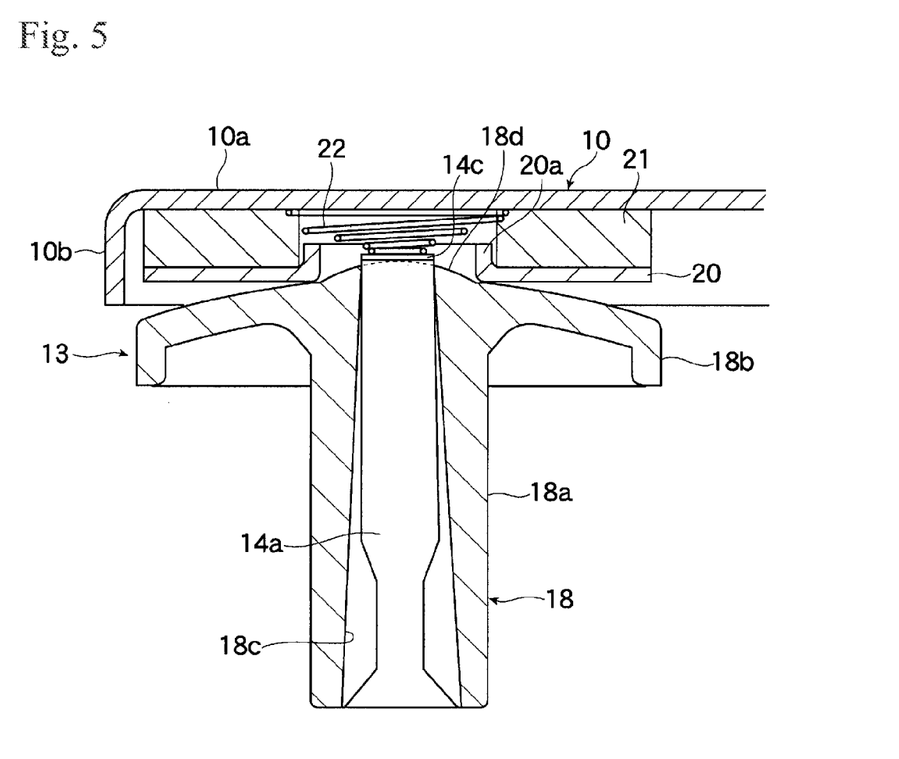
FIG. 5 is a sectional view taken along the line B-B of FIG. 4.
Figure 6:
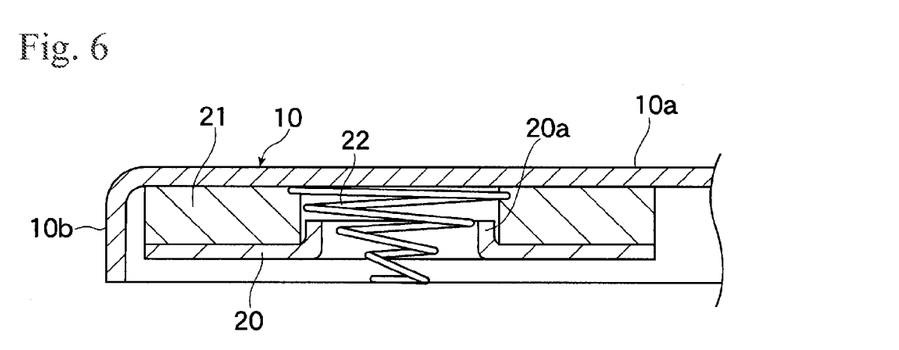
FIG. 6 is a sectional view showing a state where a coil spring and a placing plate are fixed to the pan via the gel-like cushioning body.

Next, an embodiment of the present invention will be described based on examples. FIG. 1 to FIG. 6 show a measurement device which is an example of the present invention, and FIG. 1 is a plan view when a pan is removed from a pan receiver of a load receiving portion of the measurement device which is an example of the present invention, FIG. 2 is a right side view of the load receiving portion when the pan is attached to the pan receiver, FIG. 3 shows a relationship between the load receiving portion and a measurement device body when a plate spring is fixed at positions close to both end portions in the long-side direction, and is a sectional view taken along the line A-A of FIG. 1, FIG. 4 is an enlarged sectional view showing a state where the pan is supported by a pan receiver leg via a gel-like cushioning body, FIG. 5 is a sectional view taken along the line B-B of FIG. 4, and FIG. 6 is a sectional view showing a state where a coil spring and a placing plate are fixed to the pan via the gel-like cushioning body.

In FIG. 1 to FIG. 3, the measurement device that constitutes an electrostatic capacitance type, electromagnetic balance type, or load cell type measurement device includes a pan 10 having electrical conductivity, and the pan 10 is formed, for example, in a substantially oblong shape using stainless steel and formed so that a measuring object can be mounted thereon. The pan 10 has a flat portion 10a formed flat at its front surface, and around the flat portion 10a, a bent portion 10b that is bent downward from the flat portion 10a is formed integrally. A pan receiver 12 is disposed facing the pan 10. The pan receiver 12 is formed, for example, in a substantially oblong shape in a plan view by aluminum die casting, and the pan receiver 12 consists of a fixing portion 12a formed in a flat plate shape, an inclined portion 12b formed at both sides (both left and right sides of FIG. 2) in the short-side direction of the fixing portion 12a, and a support portion 12c formed in a substantially flat plate shape adjacent to the inclined portion 12b that are integrated.

At both end sides in the long-side direction of the fixing portion 12a of the pan receiver 12, screw insertion holes 12d for insertion of tapping screws are respectively provided six each, and at a site slightly off a center portion on a back surface side of the fixing portion 12a, a projection 12e for coupling a weighing sensor (not shown) is formed. The projection 12e is arranged so as to be coupled with a side of application of load of an electrostatic capacitance type weighing sensor or electromagnetic balance type weighing sensor or load cell type weighing sensor as a weighing sensor for weighing the mass of a measuring object on the pan 10. Moreover, in four corners of the pan receiver 12, circle-shaped through-holes 12f are formed.

Moreover, on a back surface side of both end portions in the long-side direction of the pan receiver 12, metallic plate springs 14 that constitute elements of a support portion 13 to support the pan 10 from below are respectively disposed. Each plate spring 14 is, as shown in FIG. 1, formed in a substantially oblong shape, and at both end sides thereof, upwardly protruding pieces 14a that are disposed corresponding to the respective through-holes 12f and can be inserted into the through-holes 12f are formed in a bent manner, and at a position close to a middle portion thereof, six screw through-holes 14b corresponding to the screw insertion holes 12d are provided. The middle portions of the respective plate springs 14 are fixed to a bottom surface side of the pan receiver 12 by tapping screws 16 inserted into the screw insertion holes 12d, the respective upwardly protruding pieces 14a are respectively inserted into the through-holes 12f, and distal end sides of the upwardly protruding pieces 14a protrude over the pan receiver 12. In this case, the screw insertion holes 12d are formed in protruding portions 12g formed on a bottom portion side of the fixing portion 12a of the pan receiver 12, the middle portion of the plate spring 14 is fixed with the tapping screws 16 to the protruding portions (bosses) 12g, and the plate spring 14 is, although not clearly shown in the figure, formed in a ship bottom shape that causes an upward spring further at end portion sides where the upwardly protruding pieces 14a are formed, so that an elastic force of the plate springs 14 acts in a direction to protrude the upwardly protruding pieces 14a respectively toward the pan 10 side (urges the upwardly protruding pieces 14a upward).

Moreover, as shown in FIG. 4 to FIG. 6, a bent portion 14c is formed at a distal end side of each upwardly protruding piece 14a, and the bent portion 14c serves as a contact part with a coil spring 22 to be described later in detail, and is for positioning in the upper and lower direction and a drop-out prevention and retention of a pan receiver leg 18, which is also to be described later in detail. Each upwardly protruding piece 14a is in a plate shape and has the same thickness in its entirety, but is formed narrow in width due to necking at a part near the lower end.

As shown in FIG. 1 and FIG. 3, to the respective upwardly protruding pieces 14a disposed in the four corners of the pan receiver 12, mushroom-shaped pan receiver legs 18 are attached. The pan receiver legs 18 constitute elements of the support portion 13 with the pair of plate springs 14, and are arranged, as shown in an enlarged manner in FIG. 4 and FIG. 5, including barrel portions 18a and umbrella portions 18b as elastic bodies made of rubber or resin (in the example, elastomer).

Further, the barrel portion 18a is formed so as to be attachable to the outer periphery of the upwardly protruding piece 14a so that the distal end of the upwardly protruding piece 14a is exposed, and the umbrella portion 18b integrally formed on a top portion side of the barrel portion 18a has a circular arc shape in a longitudinal section and is bulged upward at the top of its head portion into a bulging portion 18d, and in the bulging portion 18d, provided is an opening 18c having a rectangular shape in a plan view that communicates with the interior of the barrel portion 18a and from which a distal end portion of the upwardly protruding piece 14a can be exposed.

As can be understood in FIG. 4 and FIG. 5, the bulging portion 18d of the umbrella portion 18b is for positioning and supporting a placing plate 20, and with the above-mentioned bulging portion 18d, the placing plate 20 being in a ring shape and having an annular projecting edge 20a protruding upward along a central hole is fitted in a lower-end inner peripheral part of the above-mentioned annular projecting edge 20a. This fitting state is set so that the placing plate 20 is displaceable with respect to the above-mentioned bulging portion 18d when a great horizontal load not less than a predetermined value is applied. To the above-mentioned placing plate 20, a ring-shaped gel-like cushioning body 21 is fixed at a lower surface in a state fitted at its central hole with the annular projecting edge 20a of the above-mentioned placing plate 20, and an upper surface of the gel-like cushioning body 21 is fixed to a bottom surface of the pan 10 (refer to FIG. 6). For the gel-like cushioning body 21, a material that can diffuse a longitudinal impact transversally to absorb impact energy is suitable. For example, a material such as Sorbothane (product name) that is excellent in cushioning performance and easy to process is suitable. Moreover, fixation thereof can be easily performed if a double-sided adhesive tape is provided in advance at upper and lower surfaces.

On the upper surface of the gel-like cushioning body 21, the upper end of a coil spring 22 made of a metal such as stainless steel which is a conductive spring member is supported, and the coil spring 22 is reduced in diameter toward the lower end to be inserted through the respective central holes of the above-mentioned gel-like cushioning body 21 and the above-mentioned placing plate 20, and contacts the bent portion 14c of the above-mentioned upwardly protruding piece 14a, while contacting the above-mentioned pan 10 at the upper end. The maximum diameter of the above-mentioned coil spring 22 is set larger than the diameter of the central hole of the gel-like cushioning body 21, and for example, when the diameter of the above-mentioned central hole is 10 mm, the maximum diameter of the above-mentioned coil spring 22 is suitably on the order of 11.5 mm.

Because the pan 10 is supported in a form of a surface by four gel-like cushioning bodies 21 and impact applied from above the pan 10 is also absorbed by the gel-like cushioning bodies 21, displacement in the vertical direction and horizontal direction is efficiently absorbed not to cause rattling between the pan receiver legs 18 and the pan 10, and also, as a result of using the placing plate 20, the gel-like cushioning bodies 21 are not fractured or broken by a creep phenomenon under a pressure exceeding a predetermined value, and the cushioning performance thereof is maintained over a long period of time.

On the other hand, a measurement device body 30, as shown in FIG. 3, includes an upper case 32 and a lower case 34, and consists of the upper case 32 and the lower case 34 that are integrated. In the upper case 32, a recess portion 32a in a substantially oblong shape having a size to match the contour of the pan 10 is formed, and at a position shifted a little from a central portion of the recess portion 32a, a pan receiver joint 32b with which the projection 12e on the pan receiver 12 side is coupled is disposed. The pan receiver joint 32b is formed in a ring shape, and is coupled at its outer peripheral side to a ring-shaped diaphragm (not shown), and the diaphragm is fixed by a screw at its outer peripheral side to the recess portion 32a of the upper case 32 via a ring-shaped diaphragm presser (not shown). That is, the pan receiver joint 32b is supported so as to be freely movable up and down on the upper case 32 via the diaphragm and diaphragm presser. The pan receiver joint 32b is coupled to a weighing sensor (not shown) disposed in the lower case 34, and there is an arrangement such that a measurement value of the weighing sensor is displayed on a display portion (not shown).

Moreover, in four corners of the recess portion 32a of the upper case 32, stoppers 32e are provided corresponding to the positions of the upwardly protruding pieces 14a of the respective plate springs 14. The respective stoppers 32e are formed in substantially columnar shapes, and protruded from the recess portion 32a toward the pan receiver 12 side. The respective stoppers 32e, when an ordinary overload transmitted at low speed acts on the plate spring 14 from the pan 10, abut against both end sides in the long-side direction of the plate springs 14 that are elastically deformed downward to obstruct the pan receiver 12 as a whole from sinking in excessively great, thereby preventing an overload acting on the weighing sensor.

Next, description will be given of a procedure for assembling the pan receiver 12, the plate springs 14, the pan receiver legs 18, etc., on the measurement device body 30.

First, when the pair of plate springs 14 are respectively fixed to the lower surface (bottom surface) side of the pan receiver 12 and the upwardly protruding pieces 14a of the respective plate springs 14 are inserted into the through-holes 12f, the respective upwardly protruding pieces 14a are brought in a mode of protrusion over the pan receiver 12. When the pan receiver legs 18 are thereafter attached to the respective upwardly protruding pieces 14a and the projecting upper ends are bent to form the bent portions 14c, a mode is brought in which, as shown in FIG. 1, the pan receiver legs 18 are disposed over the four corners of the pan receiver 12 and the bent portions 14c of the upwardly protruding pieces 14a are exposed from the openings 18c at the distal ends of the bulging portions 18d in the pan receiver legs 18. Next, by coupling with the pan receiver joint 32b on the measurement device body 30 side the projection 12e on the lower surface side of the pan receiver 12 with the plate springs 14 and the pan receiver legs 18 integrated, the pan receiver 12 is mounted on the measurement device body 30.

On the other hand, as shown in FIG. 6, the lower surfaces of the gel-like cushioning bodies 21 are adhered and fixed to the placing plates 20, the coil springs 22 are mounted on the gel-like cushioning bodies 21, and then the upper surfaces of the above-mentioned gel-like cushioning bodies 21 are adhered and fixed to a lower surface at predetermined positions in four corner portions of the pan 10. Then, by fitting the above-mentioned placing plates 20 with the bulging portions 18d of the pan receiver legs 18 and placing the pan 10 on the pan receiving legs 18, integration as a measurement device is attained. For installation of the above-mentioned placing plate 20 onto the above-mentioned bulging portion 18d, positioning can be performed easily and reliably as a result of the annular projecting edge 20a being fitted and supported on the bulging portion 18d, and no rattling occurs therebetween. However, if a great horizontal load not less than a predetermined value is applied to the pan 10, the above-mentioned placing plate 20 is displaced with respect to the above-mentioned bulging portion 18d, and the regular fitted and supported state is cancelled.

In this state, the pan 10 of the measurement device is supported in four corners on its lower surface side by the pan receiving legs 18 via the gel-like cushioning bodies 21, and the lower end of the coil spring 22 and the bent portion 14c of the upwardly protruding piece 14a contact, and also, the upper end of the coil spring 22 and the bottom surface of the pan 10 reliably contact to secure a conducting state. That is, the plate spring 14 serving as an element of the support portion 13 forms a conduction path to connect the pan 10 and the pan receiver 12 via the coil spring 22, so that the pan 10 and the pan receiver 12 have the same potential. Therefore, even if the pan 10 is charged by static electricity, the static electricity resulting from charging can be released to the pan receiver 12 via the coil spring 22 and the plate spring 14, so that the occurrence of an error in measurement value resulting from charging with static electricity can be prevented. In this case, by grounding the pan receiver 12 to a grounding member greater in capacity than the pan receiver 12, a measurement error can be made smaller even if static electricity is generated.

Moreover, even if an impact load transmitted at high speed is applied to the pan 10 during measurement, because the impact load is reliably absorbed by deformation of the gel-like cushioning bodies 21, accurate weighing can be performed and destruction of the sensor unit is prevented.

In the present example described above, because the four corners on the lower surface side of the pan 10 are supported by the ring-shaped gel-like cushioning bodies 21 fixed to the ring-shaped placing plates 20 fitted with the bulging portions 18d at the tops of the heads of the pan receiver legs 18 made of elastomer and the coil springs 22, no rattling in the vertical direction or horizontal direction occurs between the pan 10 and the support portion 13 during measurement. In addition, when a whisker-like protruding piece having flexibility is provided on a top surface of the bulging portion 18d of the pan receiver leg 18, the abutting state between the pan receiver leg 18 and the placing plate 20 is further improved to further enhance the above-mentioned effect to prevent the occurrence of rattling.

Moreover, when fixing the plate spring 14 with the tapping screw 16, either a method, as shown in FIG. 3, for fixing at a position close to an end portion in the long-side direction of the plate spring 14 or a method (not shown) for fixing at a position close to a middle portion in the long-side direction of the plate spring 14 can be adopted. In the former case, the length of an arm from the upwardly protruding piece 14a being a point of application of load to a fixing portion (site where the plate spring 14 is fixed with the tapping screw 16) is shorter than that in the latter method, and for that the plate spring 14 is strong in spring force not to be elastically deformed easily, and thus the former method is suitable for measurement of a relatively heavy-weighted measuring object, for example, a measuring object from 8 kg to 30 kg.

On the other hand, in the latter case, the length of an arm from the upwardly protruding piece 14a being a point of application of load to the fixing portion is longer than that by the former method, and for that the plate spring 14 is weak in spring force to be elastically deformed easily, and thus the former method is suitable for measurement of a relatively light-weighted measuring object, for example, a measuring object of not more than 8 kg.

Figure 7:
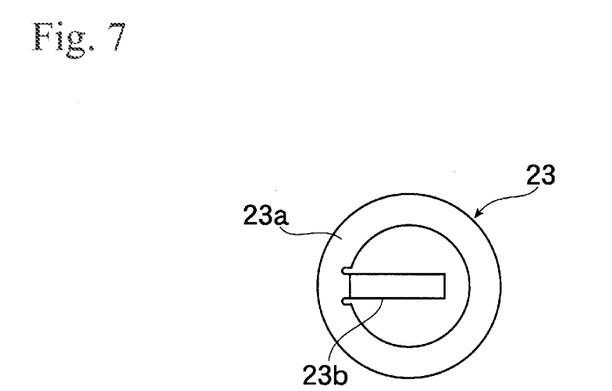
FIG. 7 is a plan view showing an example in which a plate spring is adopted as a conductive spring member.
Figure 8:
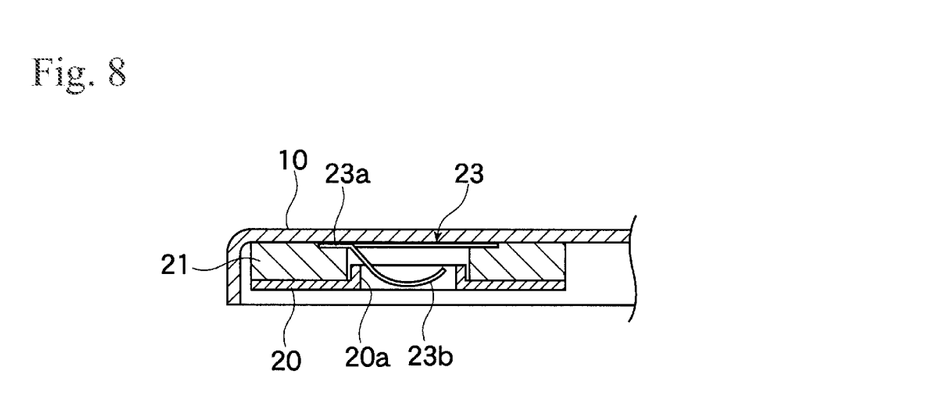
FIG. 8 is a sectional view showing a state where the plate spring and the placing plate are fixed to the pan via the gel-like cushioning body in the same example.

Further, in the present example, coil springs 22 are adopted as conductive spring members, but plate springs 23 shown in FIG. 7 and FIG. 8 may be used in place of the coil springs 22. The plate spring 23 is composed of an annular support portion 23a to be supported on the gel-like cushioning body 21 and a curved deflection portion 23b extending downward from an inner edge of the annular support portion 23a, and contacts the bent portion 14c of the upwardly protruding piece 14a at a lowermost part of the deflection portion 23b. In addition, the above-mentioned annular support portion 23a makes support by the gel-like cushioning body 21 stable, but in place of the annular support portion 23a, a straight support portion may be provided as an extension of the uppermost end of the above-mentioned sag portion 23b.

Still moreover, the plate springs 14 and the coil springs 22 of the present example are made of a metal such as stainless steel that is excellent in elastic strength, but for the use of weighing of a relatively light measuring object, the springs may be made of a conductive synthetic resin (plastic). Still further, fixation of the gel-like cushioning bodies 21 may be performed by applying an appropriate adhesive, besides using a double-sided adhesive tape. Further, when fixing the pan 10 and the gel-like cushioning bodies 21, the pan 10 may be placed on the upper surface of the gel-like cushioning bodies 21 and fixed after fitting the ring-shaped placing plates 20 with the bulging portions 18d at the tops of the heads of the pan receiver legs 18.

REFERENCE SIGNS LIST

10 Pan
12 Pan receiver
12d Screw insertion hole
12e Projection
12f Through-hole
13 Support portion
14 Plate spring
14a Upwardly protruding piece
14b Screw through-hole
14c Bent portion
16 Tapping screw
18 Pan receiver leg
18a Barrel portion
18b Umbrella portion
18c Opening
18d Bulging portion
20 Placing plate
20a Annular projecting edge
21 Gel-like cushioning body
22 Coil spring
23 Plate spring
30 Measurement device body
32 Upper case
34 Lower case

The invention claimed is:

1. A measurement device including a pan formed so that a measuring object can be mounted thereon, a pan receiver disposed facing the pan, a conductive plate spring fixed to the pan receiver and formed with a plurality of upwardly protruding pieces, and a pan receiver leg attached and integrated with each upwardly protruding piece of the plate spring so that the upwardly protruding piece is exposed from an opening provided at a distal end of a top-of-head portion, the pan receiver being coupled with a side of application of load of a weighing sensor that weighs a measuring object on the pan based on a load that acts on the pan receiver via the plate spring, wherein between the pan and the pan receiver leg, disposed is a gel-like cushioning body that contacts the pan at an upper surface and is installed at a lower surface side via a placing plate on the top-of-head portion of the pan receiver leg, while provided is a conductive spring member that is supported on the gel-like cushioning body, contacts the upwardly protruding piece of the plate spring at a lower end, and contacts the pan at an upper end.

2. The measurement device according to claim 1, wherein the placing plate has an annular projection edge that is annular and along a central hole, and is installed in this annular projection edge part on the top-of-head portion of the pan receiving leg, and the gel-like cushioning body is annular, and fixed at its central hole with the annular projection edge to be fixed to the placing plate.

3. The measurement device according to claim 1, wherein through-holes are formed in four corners of the pan receiver, the plate spring is fixed close to an edge portion on a back surface side of the pan receiver and formed at both end sides thereof with upwardly protruding pieces that penetrate through the respective through-holes upward, and the pan receiver leg is formed in a mushroom shape, and is attached and integrated with each upwardly protruding piece of the plate spring so that an upper end of the upwardly protruding piece is exposed from an opening provided in a top-of-head portion of an umbrella portion having a circular arc shape in a longitudinal section thereof.

4. The measurement device according to claim 2, wherein through-holes are formed in four corners of the pan receiver, the plate spring is fixed close to an edge portion on a back surface side of the pan receiver and formed at both end sides thereof with upwardly protruding pieces that penetrate through the respective through-holes upward, and the pan receiver leg is formed in a mushroom shape, and is attached and integrated with each upwardly protruding piece of the plate spring so that an upper end of the upwardly protruding piece is exposed from an opening provided in a top-of-head portion of an umbrella portion having a circular arc shape in a longitudinal section thereof.

* * * * *